(12) United States Patent
Anglin et al.

(10) Patent No.: US 8,316,057 B2
(45) Date of Patent: Nov. 20, 2012

(54) RESTORING DEDUPLICATED DATA OBJECTS FROM SEQUENTIAL BACKUP DEVICES

(75) Inventors: Matthew J. Anglin, Tucson, AZ (US); David M. Cannon, Tucson, AZ (US); Avishai H. Hochberg, San Jose, CA (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 12/972,307

(22) Filed: Dec. 17, 2010

(65) Prior Publication Data
US 2012/0158664 A1    Jun. 21, 2012

(51) Int. Cl.
*G06F 17/30* (2006.01)
(52) U.S. Cl. ........ 707/791; 707/706; 707/736; 707/758; 707/781; 707/802
(58) Field of Classification Search ........... 707/600–899
See application file for complete search history.

(56) References Cited

U.S. PATENT DOCUMENTS

| | | |
|---|---|---|
| 6,415,300 B1 | 7/2002 | Liu |
| 6,804,690 B1 | 10/2004 | Dysert et al. |
| 6,938,180 B1 | 8/2005 | Dysert et al. |
| 7,634,627 B1 * | 12/2009 | Ohr et al. ............... 711/162 |
| 7,953,945 B2 | 5/2011 | Bender et al. |
| 2009/0210640 A1 | 8/2009 | Davis |

OTHER PUBLICATIONS

Notice of Allowance dated Feb. 17, 2012, pp. 1-11, for U.S. Appl. No. 12/972,291, filed Dec. 17, 2010 by inventors Matthew J. Anglin et al.
U.S. Appl. No. 13/479,003, filed May 23, 2012, entitled "Restoring Data Objects From Sequential Backup Devices", invented by Matthew J. Anglin et al., pp. 1-33.
Preliminary Amendment dated May 23, 2012 for U.S. Appl. No. 13/479,003, filed May 23, 2012, invented by Matthew J. Anglin et al., pp. 1-6.
U.S. Appl. No. 12/719,108, filed Mar. 8, 2010, entitled "Approach for Optimizing Restores of Deduplicated Data".
U.S. Appl. No. 12/504,083, filed Jul. 16, 2009, entitled "An Integrated Approach for Deduplicating Data in a Distrubuted Environment That Involves a Source and a Target".
U.S. Patent Application, entitled" Restoring a Restore Set of Files From Backup Objects Stored in Sequential Backup Devices", invented by M. Anglin, D. Cannon, A. Hochberg, D. Van Hise, and M. Yakushev.

* cited by examiner

*Primary Examiner* — Isaac M Woo
(74) *Attorney, Agent, or Firm* — David W. victor; Konrad Raynes and Victor LLP (57) ABSTRACT

Provided are computer program product, system, and method for restoring deduplicated data objects from sequential backup devices. A server stores data objects of extents having deduplicated data in the at least one sequential backup device. The server receives from a client a request for data objects. The server determines extents stored in the at least one sequential backup device for the requested data objects. The server or client sorts the extents according to an order in which they are stored in the at least one sequential backup device to generate a sort list. The server retrieves the extents from the at least one sequential backup device according to the order in the sort list to access the extents sequentially from the sequential backup device in the order in which they were stored. The server returns the retrieved extents to the client and the client reconstructs the requested data objects from the received extents.

20 Claims, 6 Drawing Sheets

FIG. 6 — Server Data Object Info

| Data Object | Extent | Sequence No. |
|---|---|---|
| 1 | J | 1 |
| 1 | F | 2 |
| 1 | D | 3 |
| 1 | A | 4 |
| 1 | B | 5 |
| 2 | C | 1 |
| 2 | H | 2 |
| 2 | G | 3 |
| 3 | G | 1 |
| 3 | A | 2 |
| 3 | D | 3 |
| 3 | C | 4 |
| 3 | H | 5 |
| 3 | F | 6 |
| 3 | H | 7 |

92 = Data Object, 94 = Extent, 96 = Sequence No. (90)

FIG. 7 — Client Data Object Info

| Extent | Data Object ID | Local Indicator | Offset |
|---|---|---|---|
| C | 2 | N | 0 |
| C | 3 | N | 7340032 |
| G | 2 | N | 3610624 |
| G | 3 | N | 0 |
| A | 1 | N | 5260288 |
| A | 3 | N | 1048576 |
| B | 1 | N | 9454592 |
| F | 1 | N | 5120 |
| F | 3 | N | 10950656 |
| D | 1 | N | 3163136 |
| D | 3 | N | 5242880 |
| H | 2 | N | 3072000 |
| H | 3 | N | 10412032 |
| H | 3 | N | 14108672 |

102 = Extent, 104 = Data Object ID, 106 = Local Indicator, 108 = Offset (100)

FIG. 8

| Extent | Extent Size |
|---|---|
| A | 4194304 |
| B | 1228800 |
| C | 3072000 |
| D | 2097152 |
| G | 1048576 |
| H | 538624 |
| J | 5120 |
| F | 3158016 |

FIG. 9 — Extent Info

| Extent | Backup Device | Device Storage Location |
|---|---|---|
| J | 3 | 0 |
| F | 2 | 8192 |
| D | 2 | 8388608 |
| H | 2 | 2097152 |
| C | 1 | 1024 |
| G | 1 | 5218304 |

122 = Extent, 124 = Backup Device, 126 = Device Storage Location (120)

RESTORING DEDUPLICATED DATA OBJECTS FROM SEQUENTIAL BACKUP DEVICES

BACKGROUND OF THE INVENTION

1. Field of the Invention

The present invention relates to a computer program product, system, and method for restoring deduplicated data objects from sequential backup devices.

2. Description of the Related Art

In a network backup environment, client systems back-up their data to a backup server over a network. The backup server maintains a database of backup objects providing information on backup objects stored in backup storage pools. The client systems may restore data objects from the backup objects maintained by the backup server.

The backup client and server may implement data deduplication, which removes redundant data during a backup operation to optimize storage space and conserve network bandwidth. The backup operation may back-up data in chunks or extents of data, such that if multiple data objects share the same extent, then only one instance of the extent is stored in backup storage.

Deduplication during storage backup activities can be performed at the data source (client), data target (server), or on a deduplication appliance connected to the backup server. The restoration of deduplicated data from the server to the client involves reconstruction of the data from deduplicated chunks or extents. In current systems, the deduplicated data is stored on disk, and the backup sever will access the extents for data objects to restore from the disk, and then return full data objects to the client, including objects that have common extents. Even if the same extent is found in many data objects (or even in the same object) selected for restore, that chunk or extent will be restored and transmitted from the server to the client multiple times. The backup server may access the extents from disk in any order due to the random access nature of the disk-based storage.

There is a need in the art for improved techniques for handling the restoration of data objects in different storage environments.

SUMMARY

Provided are computer program product, system, and method for restoring deduplicated data objects from sequential backup devices. A server stores data objects of extents having deduplicated data in the at least one sequential backup device. The server receives from a client a request for data objects. The server determines extents stored in the at least one sequential backup device for the requested data objects. The server or client sorts the extents according to an order in which they are stored in the at least one sequential backup device to generate a sort list. The server retrieves the extents from the at least one sequential backup device according to the order in the sort list to access the extents sequentially from the sequential backup device in the order in which they were stored. The server returns the retrieved extents to the client and the client reconstructs the requested data objects from the received extents.

DETAILED DESCRIPTION

A backup server stores extents from multiple data objects in sequential-access devices, such that only one instance of each extent is backed-up for extents included in multiple data objects. Restoration of data from sequential-access media (such as magnetic tape) requires time to mount cartridges and position the device reader to the data extents. Sequential-access media comprises storage where data location must be accessed in a sequential manner. In the prior art, a restore operation of deduplicated data from sequential-access media would require multiple volume mount and seek operations thus resulting in poor access performance. The described embodiments provide improved performance and efficient techniques to restore deduplicated data from sequential-access media. To allow a client to reconstruct data objects from extents backed-up in sequential-access media with deduplication, the backup server provides the client with information on requested data objects to restore and extents in the data objects. The backup server accesses the extents included in the requested data objects from the sequential-access device in the order in which the extents are stored across the sequential backup devices and returns the extents to the client to reconstruct the data objects from the received extents.

Figure 1:
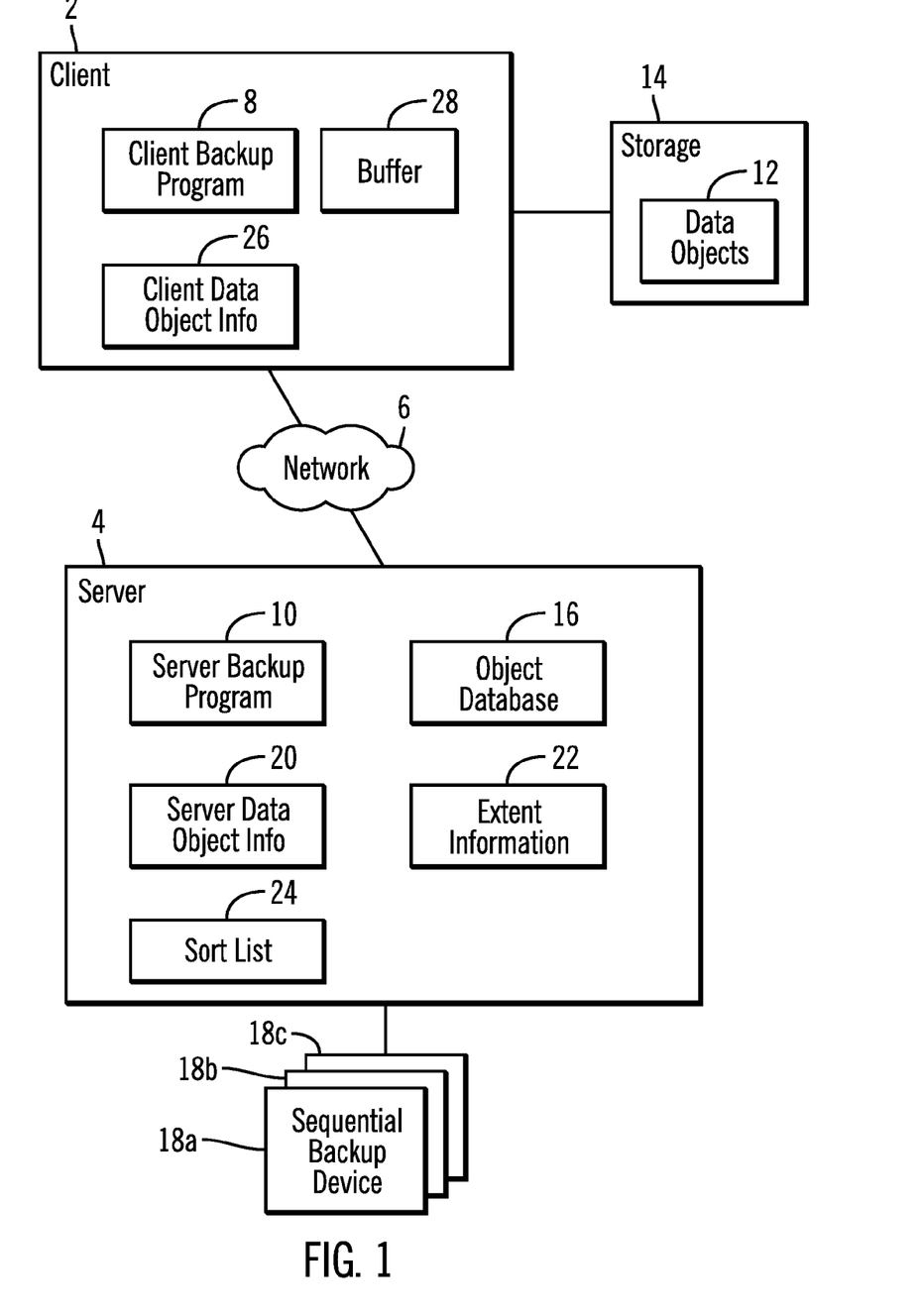
FIG. 1 illustrates an embodiment of a network backup environment.

FIG. 1 illustrates an embodiment of a network backup environment. The environment includes a client system 2 and server system 4 that communicate over a network 6. The client 2 and server 4 include a client backup program 8 and server backup program 10, respectively, to perform client-server backup related operations to provide backup services for the client 2, including backing-up data objects 12 maintained by the client 2 in local storage 14. Although one client 2 is shown, the server 4 may provide backup services for multiple client systems over the network 6. The term "backup" as used herein refers to other backup related operations, such as archive and space management operations.

The server backup program 10 maintains an object database 16 providing information on data objects backed-up from the client 2 in one or more sequential backup devices 18a, 18b, 18c. Sequential backup devices 18a, 18b, 18c comprise sequential-access devices in which data is sequentially read from and written to physically sequential storage locations, such as magnetic tape media or other sequential access devices in which the media needs to be mounted and seek operations are performed to move the read head to a track location on the sequential access media. The object database 16 would include information on the extents defined in the data objects, the client from which the objects originated, the location in client storage 14 that included the data objects, and other attributes and metadata on the data objects and source client 2.

To restore data objects from the server 4, the server backup program 10 generates server data object information 20 on data objects to restore from the sequential backup devices 18a, 8b, 18c, extent information 22 indicating a location of extents in the data objects to restore in the sequential backup devices 18a, 18b, 18c, and a sort list 24 indicating an order in which extents from the sequential backup devices 18a, 18b, 18c are to be retrieved and returned to the client 2. The client backup program 8 generates client data object information 26 providing information on data objects the client has requested to restore, including extents in the data objects and offsets of the extents in the data objects. In certain embodiments, when the client backup program 8 receives extents from the server backup program 10, the client backup program 8 may immediately add the received extents to the data objects that are being restored. In one embodiment, the server backup program 10 may generate the sort list 24. In an alternative embodiment, the client backup program 8 may generate the sort list 24.

In certain embodiments, when restoring multiple files, the client backup program 8 may make a restored file available when the restoration is completed even if other files in the restore request have not been completely restored. The client backup program 8 may not permit access to a data object being restored until all extents are included to prevent access to partially restored files. If the restoration fails, then the client backup program 8 may remove the partially restored file to prevent access to a file only partially restored. Alternatively, the client backup program 8 may store in a buffer 28 extents received from the server backup program 10 for data objects to restore.

To prevent the use of partially restored data objects, a data object that is in the process of being restored may be renamed, such as with an extension ".TMP" added to the file name. Alternatively, a data object being restored may be reconstructed in a staging directory from which the data object is not accessible until the data object is fully reconstructed and returned to the active directory in which it is accessible. In a yet further embodiment, a data object being reconstructed may be configured with a special permission indicating that it is not available for access by applications.

An extent comprises a chunk or block of data assigned to a data object, such that a data object may be configured to include one or more extents. A data object may comprise a file, a database, a file system, or any other grouping of data.

The network 6 may comprise a Local Area Network (LAN), Storage Area Network (SAN), Wide Area Network (WAN), wireless network, etc. The client 2 and server 4 may comprise an enterprise storage server, storage controller, blade server, general purpose server, desktop computer, workstation, telephony device, personal digital assistant (PDA), etc., or other computing device.

The storage 14 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, etc. The sequential backup devices 18a, 18b, 18c comprise a storage device or element where data can only be accessed (read or written) in a predetermined, ordered sequence, such as magnetic tape media, sequential-access memory (SAM), etc.

The server 4 may be implemented in a distributed storage environment or network storage environment, such as "cloud" storage, to provide backup services to clients 2 in the cloud. Alternatively, the client 2 and server 4 may comprise software or a combination of software and hardware components in a same system, such as separate programs executing in a same memory.

Figure 2:
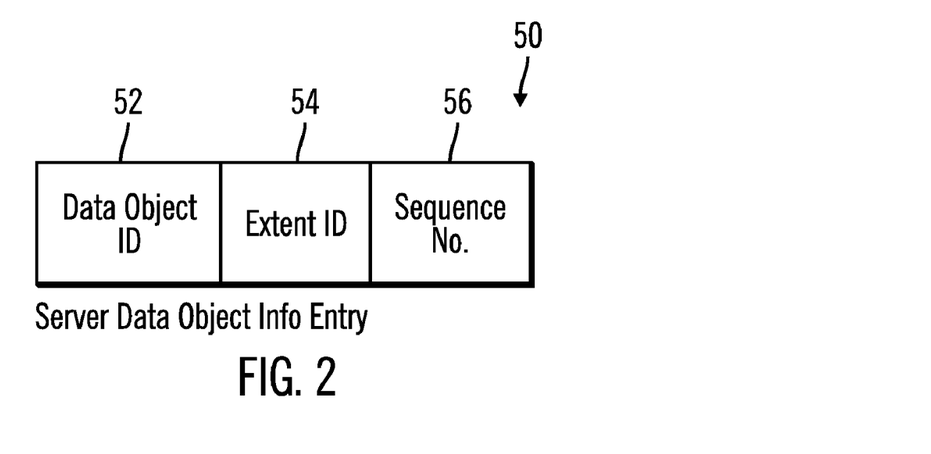
FIG. 2 illustrates an embodiment of server data object information.

FIG. 2 illustrates an embodiment of an entry 50 in the server data object information 20 generated from the object database 16 including a data object ID 52 of a data object to restore and an extent 54 in the data object. There would be one entry 50 for each extent in the data objects to restore. There could be multiple entries 50 indicating a same extent in field 54 if multiple data objects to restore share a common extent, such that there are entries 50 for multiple data objects 52 indicating the same extent 54. A sequence number 56 provides the sequence number of each extent within the data object so the client backup program 8 can compute offsets for those extents. The same extent may occur multiple times within the same data object 52, in which case the server data object info 50 would have multiple entries for that extent, each with a different sequence number. When the server 4 sends the data object information 50 to the client, sequence numbers are included.

Figure 3:
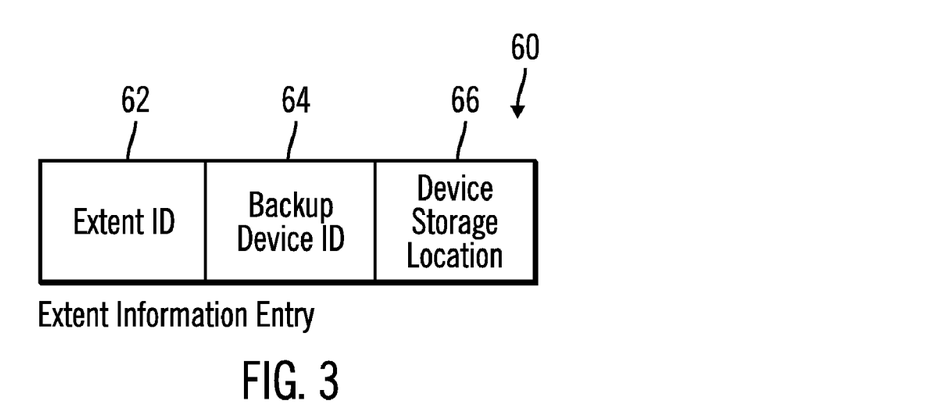
FIG. 3 illustrates an embodiment of extent information.

FIG. 3 illustrates an embodiment of an entry 60 in the extent information 22 the server backup program 10 maintains that indicates an extent identifier (ID) 62 for extents in the data objects to restore, a backup device ID 64 of a sequential backup device 18a, 18b, 18c including the extent 62, and a device storage location 66 indicating the block or location in the sequential backup device 64 having the extent. There is one entry 60 for each extent in the data objects, so an extent included in multiple data objects would only have one entry 60 in the extent information 22 indicating the location in the sequential backup device 18a, 18b, 18c of the extent.

Figure 4:
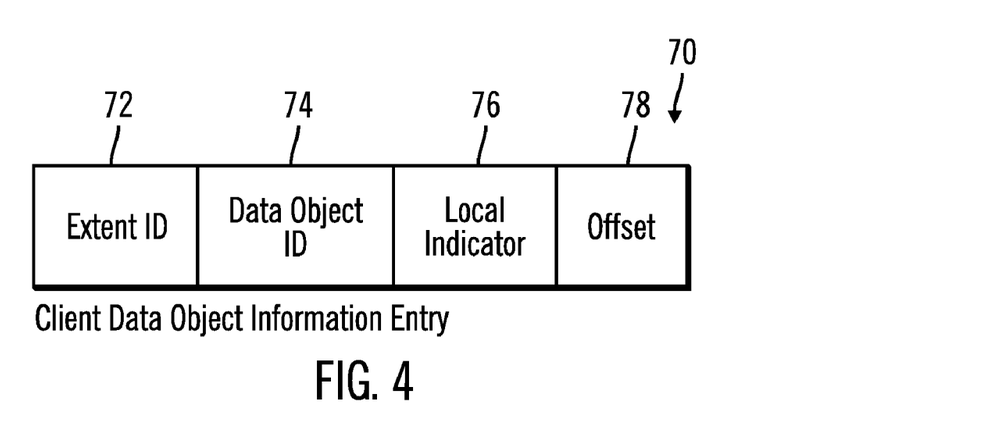
FIG. 4 illustrates an embodiment of client data object information.

FIG. 4 illustrates an embodiment of an entry 70 in the client data object information 26 the client backup program 8 maintains that indicates an extent 72 for each extent in the data objects to restore, a data object ID 74 of a data object in which the extent 72 is included, a local indicator 76 indicating whether the extent is stored locally in the client local storage 14, and an offset 78 of the extent 72 in the data object 74. There could be multiple extent entries 70 indicating a same extent in field 72 if multiple data objects share a common extent, such that multiple entries 70 have the same extent 72 for different data object IDs 74. Similarly, there could be multiple extent entries 70 for the same data object, if that extent occurs at multiple locations within the data object.

In certain embodiments, the client 8 and/or server 10 backup programs implement data deduplication to ensure that that only one instance of an extent that may be maintained in multiple data objects is backed-up in the sequential backup devices 18a, 18b, 18c. The object database 16 would identify the location of the extents for data objects in the sequential backup devices 18a, 18b, 18c.

Figure 5:
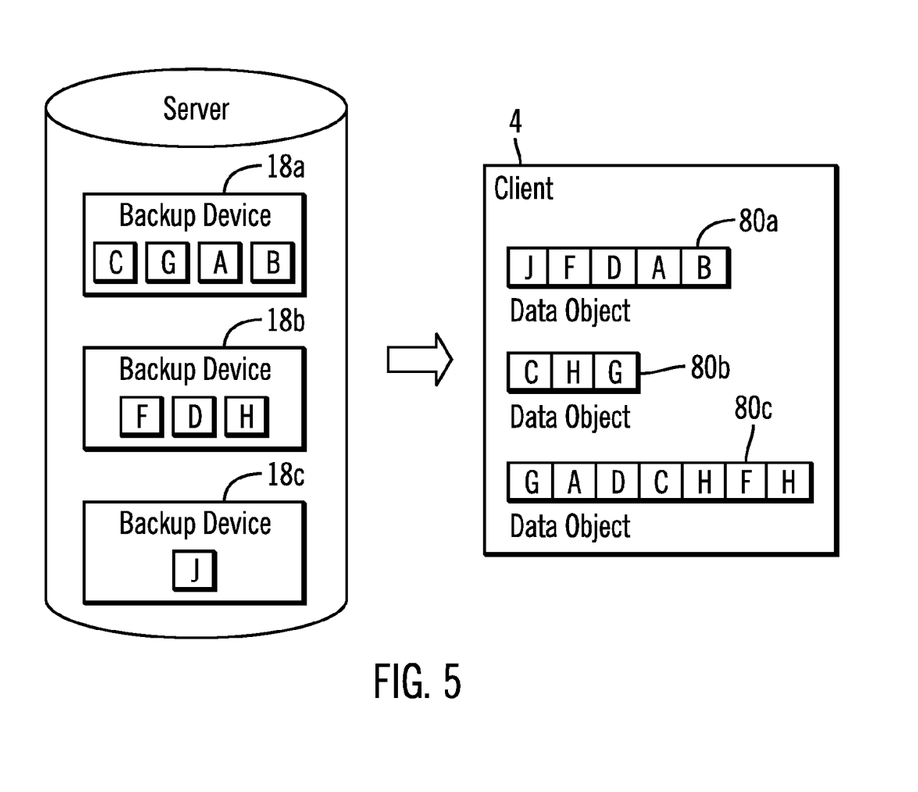
FIG. 5 illustrates an example of how the backup server maintains extents in backup devices for data objects maintained by the client.

FIG. 5 illustrates an example of how the server 4 has three sequential backup devices 18a, 18b, 18c that have only one instance of extents C, G, A, B, F, D, H, J. The client 4 has data objects 80a, 80b, 80c comprised of extents backed-up in the backup devices 18a, 18b, 18c. The data objects 80a, 80b, 80c may share extents. Further, there could be multiple instances of an extent in the same data object. For instance, data objects 80b and 80c have common extents C, H, and G, and data objects 80a and 80c have common extents A, D, F. Data object 80c has two instances of extent H. Although the client 4 may maintain data objects 80a, 80b, 80c having common extents, when those extents are backed-up in the backup devices 18a, 18*b*, 18*c*, deduplication provides only one instance of each extent stored in the backup devices 18*a*, 18*b*, 18*c*.

Figure 6:
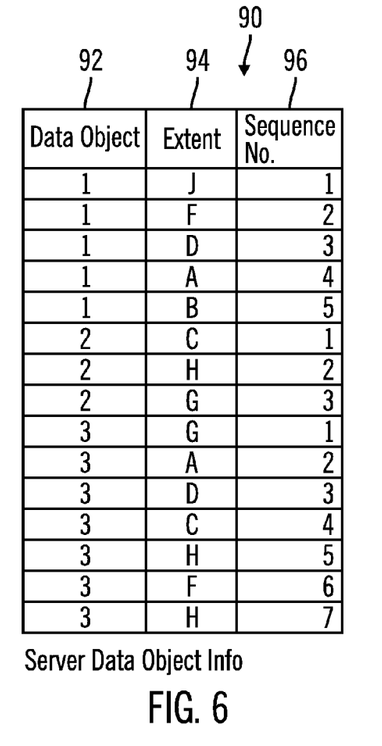
FIG. 6 illustrates an example of server data object information.

FIG. 6 illustrates an example of server data object information 90, comprising an example of server data object information 20 (FIG. 1), for the data object example of FIG. 5, which has an extent column 92 providing an extent for each data object to restore indicated in a data object column 94, such that the entries are ordered according to the data object ID in the data object column 94. The server data object information 20 indicates common extents in the data objects, such as extents F, D, A, C, and H in data objects 1, 2, and 3. A sequence number 96 provides a sequence number of the extent within the data object 90 that is provided by the server 4 to the client 2. The client backup program 8 may use the extent sizes (FIG. 8) and sequence number (FIG. 6) to compute the offsets of extents within the data object as shown in FIG. 7.

Figure 7:
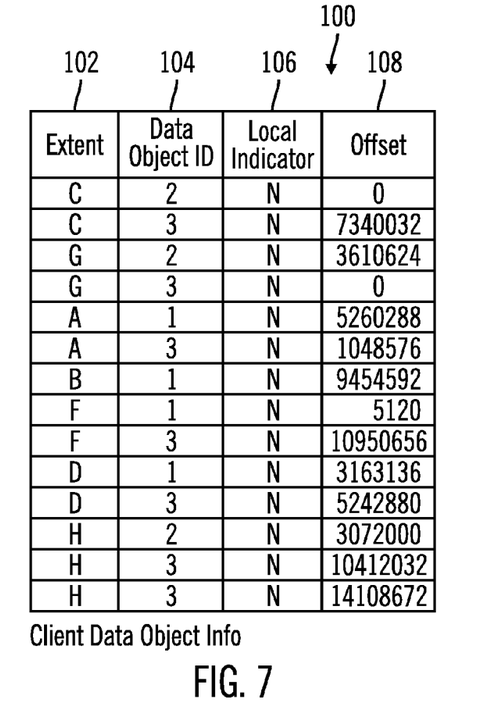
FIG. 7 illustrates an example of client data object information.

FIG. 7 illustrates an example of client data object information 100, comprising an example of the client data object information 26 (FIG. 1), for the data object example of FIG. 5, which has an extent column 102 having the extents for each data object, indicated in a data object column 104. Local indicator column 106 includes local indicators 76 (FIG. 4) indicating whether the extent identified in extent column 102 is maintained locally in the client. The offset column 108 indicates an offset location 78 in the data object of the extent, such as an integer number, block number, etc. The offset data in the offset column 108 is calculated based on the sequence number 96 (FIG. 6), 56 (FIG. 2) of each extent within the data object 92 and 52 and the extent sizes, both of which may received from the server 4.

Figure 8:
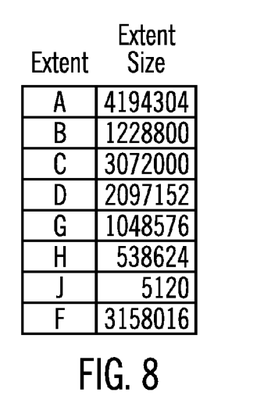
FIG. 8 illustrates information on extent sizes from which the offsets in FIG. 7 are calculated.

FIG. 8 provides an example of extent sizes that the server 4 provides to the client backup program 8. Alternatively, the client 2 may cache the sizes locally, but if that information is not available during restore, the client may use the information from the server 4.

Figure 9:
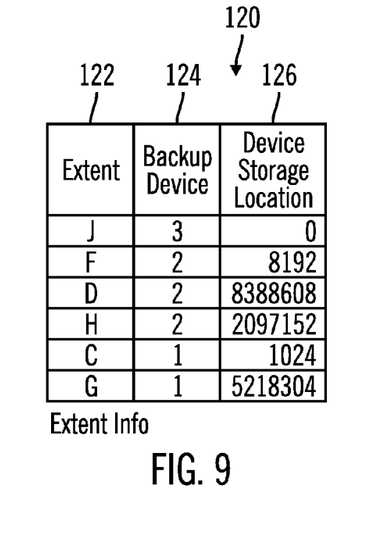
FIG. 9 illustrates an example of extent information.

FIG. 9 illustrates an example of extent information 120, comprising an example of the extent information 22 (FIG. 1), for the data object example of FIG. 5, which has an extent column 122 having one instance of each extent, a backup device column 124 indicating the sequential backup device 18*a*, 18*b*, 18*c* including the extent, and a device storage location column 126 having the address or location of the extent on the backup device 124. The extent information 22 is sorted according to backup device column 124 and the device storage location 126 address, to indicate the backup devices 18*a*, 18*b*, 18*c* and storage locations having the extents in the data objects to restore.

Figure 10:
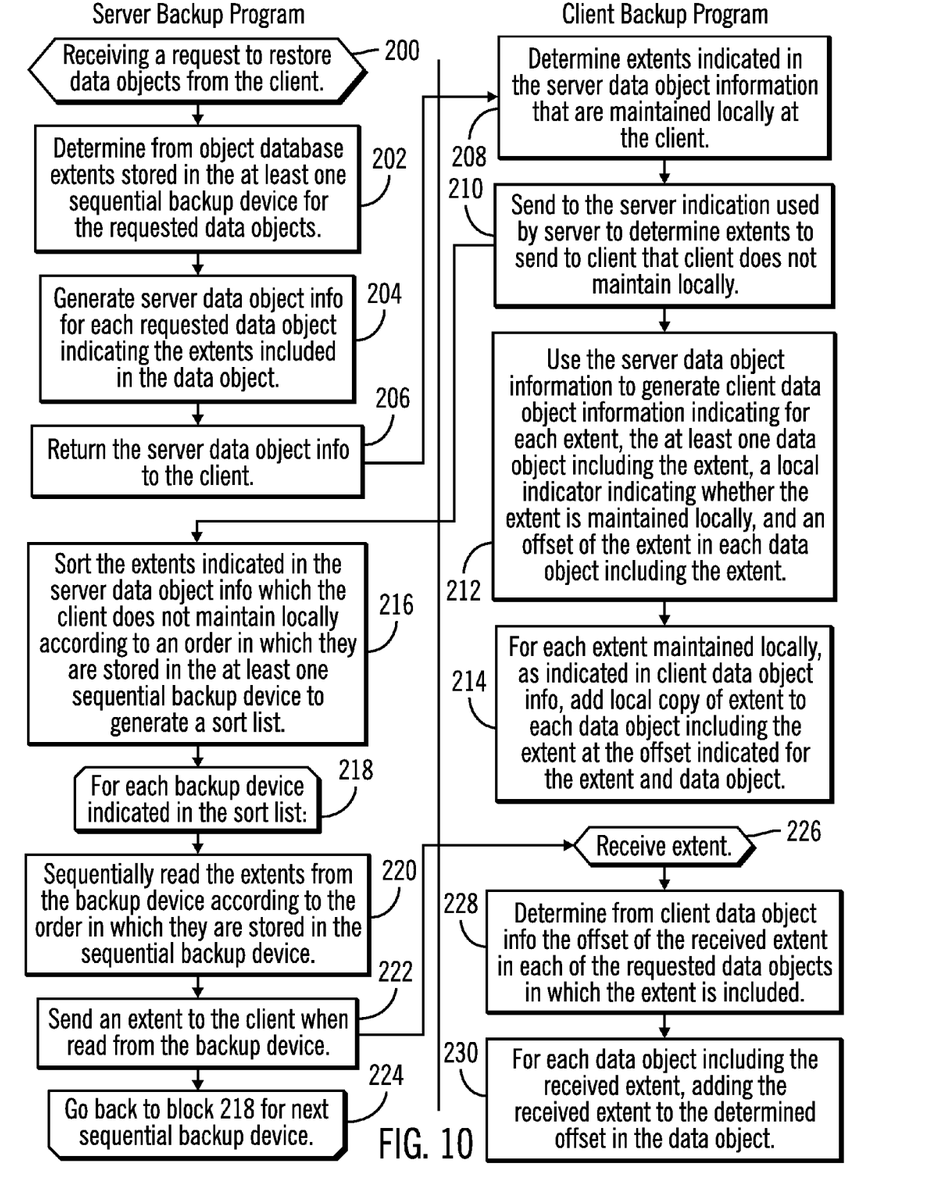
FIG. 10 illustrates an embodiment of operations to restore data objects in a backup client server environment.

FIG. 10 illustrates an embodiment of operations performed by the server backup program 10 and client backup program 8 to restore data objects. Upon the server backup program 10 receiving (at block 200) a request to restore data objects stored in the sequential backup devices 18*a*, 18*b*, 18*c*, the server backup program 10 determines (at block 202) from the object database 16 extents stored in the at least one sequential backup device 18*a*, 18*b*, 18*c* for the requested data objects. The server backup program 10 generates (at block 204) server data object information 20 for each requested data object to restore indicating the extents 54 (FIG. 2) included in the data object 52 to restore, such as shown in FIG. 6. The server backup program 10 may then return (at block 206) the server data object information 20 and extent size information to the client 2.

Upon receiving the server data object information 20, the client backup program 8 determines (at block 208) extents in the data object to restore maintained locally at the client storage 14. The client backup program 8 sends (at block 210) to the server 4 indication of extents, which the server uses to determine the extents to send to the client 2, which does not include the extents the client 2 maintains locally in local storage 14. In one embodiment, the client backup program 8 may send the server 4 a list of those extents maintained locally or a list of the extents in the data objects to restore that the client 2 does not maintain locally.

The client backup program 8 uses (at block 212) the server data object information to generate client data object information 26 indicating for each extent 72 (FIG. 4), the at least one data object 74 including the extent, a local indicator 76 of whether the extent is maintained locally, and an offset 78 of the extent in each data object including the extent. For each extent maintained locally, as indicated in client data object information 20 local indicator 76, the client backup program 8 adds (at block 214) a local instance of the extent to each data object to restore including the extent at the offset 78 indicated for the extent and data object.

Upon the server backup program 10 receiving the indication used to determine extents the client does not maintain locally, the server backup program 10 sorts (at block 216) the extents indicated in the server data object information 20 that the client does not maintain locally according to an order in which they are stored in the at least one sequential backup device 18*a*, 18*b*, 18*c* to generate a sort list 24. The sort list 24 provides a plan for the server backup program 10 to sequentially access extents from the sequential backup devices 18*a*, 18*b*, 18*c*. In an alternative embodiment, the client backup program 8 may generate the sort list 24. The server backup program 10 then performs a loop of operations at blocks 218 through 224 for each backup device indicated in the sort list 24. For each backup device 18*a*, 18*b*, 18*c*, the server backup program 10 sequentially reads (at block 220) the extents in the sort list 24 from the sequential backup device 18*a*, 18*b*, 18*c* according to the order in which they are stored in the sequential backup device, as indicated in the sort list 24. The server backup program 10 may send (at block 222) extents to the client 4 as they are read from the sequential backup device 18*a*, 18*b*, 18*c*.

In one embodiment, upon receiving (at block 226) an extent from the server 4, the client backup program 8 may determine (at block 228) from the client data object information 26 the offset 78 of the received extent in each of the requested data objects 74 in which the extent is included. The client backup program 8 may use the extent sizes (FIG. 8) and sequence number 96 (FIG. 6) in the received server data object (FIGS. 2 and 6) to compute the offsets of extents 108 (FIG. 7). For each data object including the received extent, the client backup program 8 adds (at block 230) the received extent to the determined offset in the requested data object to restore. In this way, the data objects are reconstructed as extents are received either from the server 4 or retrieved locally from the storage 14.

In an alternative embodiment, the client backup program 8 may gather extents received from the server 4 and retrieved locally in the buffer 28, such that the data object is reconstructed after all extents for the data object to restore are available in the buffer. The buffer 28 may be implemented in either memory or on a disk storage device. Extents may be staged in the buffer 28 until all extents are retrieved at which point the entire object is reconstructed from the staged data or blocks maintained locally.

Described embodiments provide techniques to restore data objects comprising extents stored in sequential backup devices to optimize sequential retrieval of the extents from the sequential backup devices in embodiments where deduplication is used to back-up the extents of the data objects so that only one instance of an extent maintained in multiple data objects is backed-up in the sequential backup devices 18a, 18b, 18c. The backup server returns extents to the client, which the client adds to each data object being restored that includes that received extent. This optimizes storage by only backing-up one instance of an extent and optimizes network bandwidth by only transmitting one instance of an extent even if that extent is included in multiple data objects the client 2 is restoring from the backup server 4 over the network The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server 4 of FIG. 1 may provide hosts and clients backup services in a network cloud.

Figure 11:
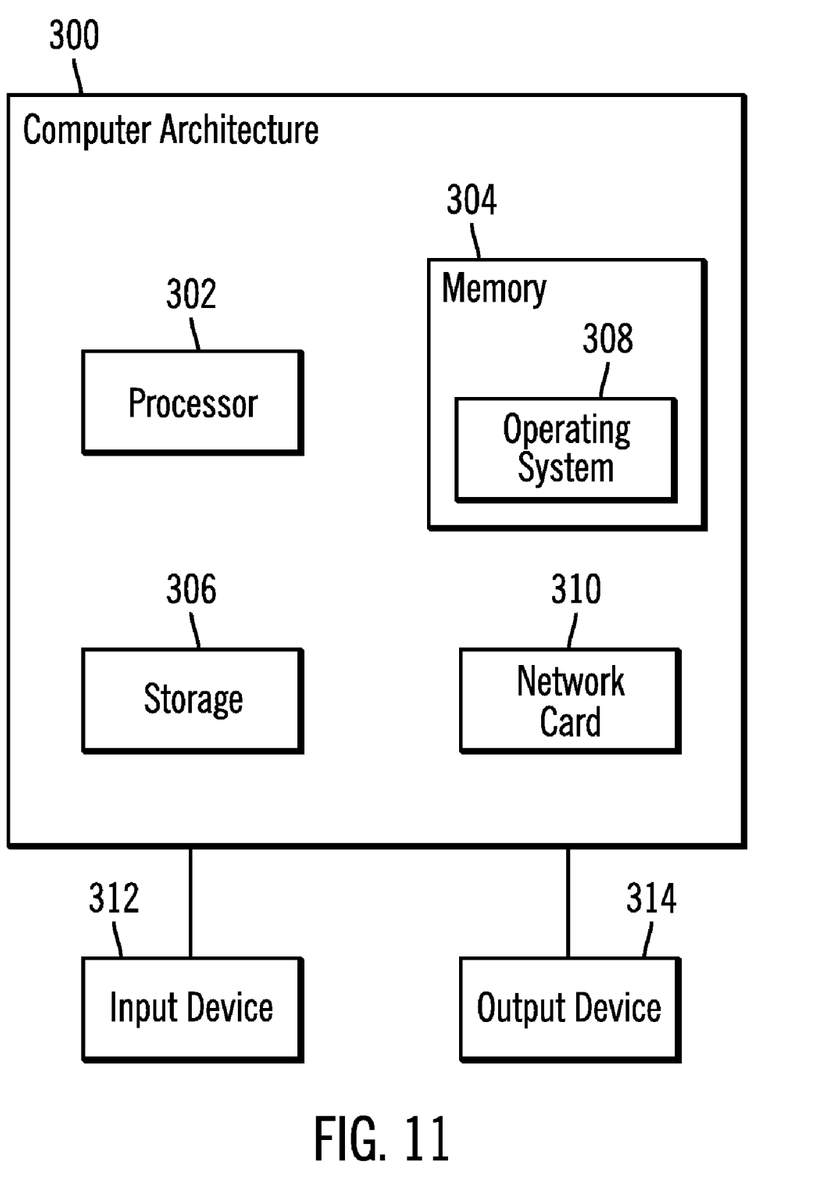
FIG. 11 illustrates an embodiment of a computer architecture.

FIG. 11 illustrates an embodiment of a computer architecture 300 that may be implemented at the client 2 and server 4 in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating 10 system 308 and the backup programs 8 and 10 in the storage 306 are loaded into the memory 304 and executed by the processor 302. The memory 304 may further include data structures, such as information 16, 20, 22, 24, and 26. The architecture further includes a network card 310 to enable communication with the network 30. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for restoring data objects from at least one sequential backup device, the computer program product comprising a computer readable storage medium having computer readable program code embodied therein that executes to perform client and server operations, the operations comprising:
   storing, by the server, data objects of extents having deduplicated data in the at least one sequential backup device;
   receiving from the client, by the server, a request for data objects;
   determining, by the server, extents stored in the at least one sequential backup device for the requested data objects;
   sorting, by the server or the client, the extents according to an order in which they are stored in the at least one sequential backup device to generate a sort list;
   retrieving, by the server, the extents from the at least one sequential backup device according to the order in the sort list to access the extents sequentially from the sequential backup device in the order in which they were stored;
   returning, by the server, the retrieved extents to the client; and
   reconstructing, by the client, the requested data objects from the received extents.

2. The computer program product of claim 1, wherein the requested data objects are stored in a plurality of sequential backup devices, wherein the sorting of the extents in the sort list is performed for each of the sequential backup devices including extents for the requested data objects to produce one sort list for each of the sequential backup devices, and wherein the retrieving comprises retrieving all the extents for each of the sequential backup devices according to the order in the sort list for the sequential backup device to access the extents sequentially in the sequential backup device according to the order in which they were written to the sequential backup device.

3. The computer program product of claim 1, wherein the storing of the data objects in the sequential backup devices only stores one instance of an extent, wherein at least two of the requested data objects include at least one common extent, and wherein the returned extents include only one instance of the at least one common extent included in the at least two data objects.

4. The computer program product of claim 3, further comprising:
   maintaining, by the client, client data object information of extents included in the requested data objects,
   wherein reconstructing the requested data objects comprises using the client data object information to determine the data object to which to add the received extents, wherein the at least one common extent is included in each of the at least two data objects including the common extent.

5. The computer program product of claim 3, wherein the client data object information indicates for each extent in a data object, at least one offset in the data object at which the extent in the data object is located, wherein each extent in the data object can occur at one or more offsets within the data object, wherein reconstructing the requested data objects comprises performing in response to receiving each extent:

determining the at least one offset of the received extent in each of the requested data objects in which the extent is included;

for each data object including the received extent, adding the received extent to the determined at least one offset in the data object, wherein extents are included in data objects as the extents are received.

6. The computer program product of claim 3, wherein the client data object information indicates for each extent in the data object, at least one offset in the data object at which the extent is located, wherein each extent in the data object can occur at one or more offsets within the data object, wherein reconstructing the requested data objects comprises performing:

buffering the received extents until all the extents for the requested data objects are available;

determining the offsets of the received extents in the requested data objects; and adding the buffered received extents to the determined offsets in one of the requested data objects in response to buffering all the extents for the data object received from the server.

7. The computer program product of claim 3, wherein the operations further comprise determining, by the client, extents in the requested data objects maintained locally at the client; and sending, by the client, to the server indication of extents in the requested data objects not maintained locally at the client, wherein the server returns the indicated extents to the client that the client does not maintain locally, and wherein the client reconstructs the requested data objects from the extents received from the server and the extents in the requested data objects maintained locally at the client.

8. The computer program product of claim 3, further comprising:

maintaining, by the server, extent information indicating locations of the extents stored in the sequential backup devices;

generating, by the server, server data object information for each requested data object indicating the extents included in the data object;

returning, by the server, the server data object information to the client; and receiving, by the server, from the client indication used by the server to determine extents the client does not maintain locally, wherein the server returns the extents the client does not maintain locally to the client.

9. The computer program product of claim 8, wherein the server data object information indicates multiple instances of the extents that are included in multiple data objects, wherein the sort list includes only one instance of each extent, including extents included in multiple of the requested data objects, further comprising:

using, by the client, the server data object information to generate client data object information indicating for each extent, each data object including the extent, wherein reconstructing, by the client, the requested data objects comprises using the client data object information to add the received extents to the requested data objects that include the extents, wherein the at least one common extent is included in each of the at least two data objects including the common extent as indicated in the client data object information.

10. A system in communication with a client and at least one sequential backup device, comprising:

a processor;

a computer readable storage medium including code executed by the processor to perform operations, the operations comprising:

storing data objects having extents of deduplicated data in the at least one sequential backup device;

receiving from the client, a request for data objects;

determining extents stored in the at least one sequential backup device for the requested data objects;

providing a sort list having a sorting of the extents according to an order in which they are stored in the at least one sequential backup device;

retrieving the extents from the at least one sequential backup device according to the order in the sort list to access the extents sequentially from the sequential backup device in the order in which they were stored; and returning the retrieved extents to the client, wherein the client reconstructs the requested data objects from the received extents.

11. The system of claim 10, wherein the requested data objects are stored in a plurality of sequential backup devices, wherein the sorting of the extents in the sort list is performed for each of the sequential backup devices including extents for the requested data objects to produce one sort list for each of the sequential backup devices, and wherein the retrieving comprises retrieving all the extents for each of the sequential backup devices according to the order in the sort list for the sequential backup device to access the extents sequentially in the sequential backup device according to the order in which they were written to the sequential backup device.

12. The system of claim 10, wherein the storing of the data objects in the sequential backup devices only stores one instance of an extent, wherein at least two of the requested data objects include at least one common extent, and wherein the returned extents include only one instance of the at least one common extent included in the at least two data objects.

13. A system in communication with at least one sequential backup device, comprising:

a client having a client backup program;

a server having a server backup program, wherein the server is in communication with the client;

wherein the server backup program is executed to perform:

storing data objects having extents of deduplicated data in the at least one sequential backup device;

receiving from the client a request for data objects;

determining extents stored in the at least one sequential backup device for the requested data objects;

providing a sort list having a sorting of the extents according to an order in which they are stored in the at least one sequential backup device;

retrieving the extents from the at least one sequential backup device according to the order in the sort list to access the extents sequentially from the sequential backup device in the order in which they were stored; and returning the retrieved extents to the client;

wherein the client backup program is executed to reconstruct the requested data objects from the received extents.

14. The system of claim 13, wherein the storing of the data objects in the sequential backup devices only stores one instance of an extent, wherein at least two of the requested data objects include at least one common extent, and wherein the returned extents include only one instance of the at least one common extent included in the at least two data objects.

15. The system of claim 14, wherein the client backup program is further executed to maintain client data object information of extents included in the requested data objects, wherein reconstructing the requested data objects comprises using the client data object information to determine the data object to which to add the received extents, wherein the at least one common extent is included in each of the at least two data objects including the common extent.

16. The system of claim 14, wherein the client data object information indicates for each extent in a data object, at least one offset in the data object at which the extent in the data object is located, wherein each extent in the data object can occur at one or more offsets within the data object, wherein reconstructing the requested data objects comprises performing in response to receiving each extent:
   determining the at least one offset of the received extent in each of the requested data objects in which the extent is included;
   for each data object including the received extent, adding the received extent to the determined at least one offset in the data object, wherein extents are included in data objects as the extents are received.

17. The system of claim 14, wherein the client data object information indicates for each extent in the data object, at least one offset in the data object at which the extent is located, wherein each extent in the data object can occur at one or more offsets within the data object, wherein reconstructing the requested data objects comprises performing:
   buffering the received extents until all the extents for the requested data objects are available;
   determining the offsets of the received extents in the requested data objects; and
   adding the buffered received extents to the determined offsets in one of the requested data objects in response to buffering all the extents for the data object received from the server.

18. The system of claim 14, wherein the client backup program is further executed to perform:
   determining extents in the requested data objects maintained locally at the client; and
   sending to the server indication of extents in the requested data objects not maintained locally at the client, wherein the server returns the indicated extents to the client that the client does not maintain locally, and wherein the client reconstructs the requested data objects from the extents received from the server and the extents in the requested data objects maintained locally at the client.

19. The system of claim 14, wherein the server backup program is further executed to perform:
   maintaining extent information indicating locations of the extents stored in the sequential backup devices;
   generating server data object information for each requested data object indicating the extents included in the data object;
   returning the server data object information to the client; and
   receiving from the client indication used by the server to determine extents the client does not maintain locally, wherein the server returns the extents the client does not maintain locally to the client.

20. The system of claim 19, wherein the server data object information indicates multiple instances of the extents that are included in multiple data objects, wherein the sort list includes only one instance of each extent, including extents included in multiple of the requested data objects, wherein the client backup program is further executed to perform:
   using the server data object information to generate client data object information indicating for each extent, each data object including the extent, wherein reconstructing, by the client, the requested data objects comprises using the client data object information to add the received extents to the requested data objects that include the extents, wherein the at least one common extent is included in each of the at least two data objects including the common extent as indicated in the client data object information.

\* \* \* \* \*